United States Patent
Yen

(10) Patent No.: US 10,394,545 B2
(45) Date of Patent: Aug. 27, 2019

(54) CONTROL METHOD OF UPDATING FIRMWARE

(71) Applicant: MITAC COMPUTING TECHNOLOGY CORPORATION, Taoyuan (TW)

(72) Inventor: Chi-Yuan Yen, Taoyuan (TW)

(73) Assignee: MITAC COMPUTING TECHNOLOGY CORPORATION, Taoyuan (TW)

(*) Notice: Subject to any disclaimer, the term of this patent is extended or adjusted under 35 U.S.C. 154(b) by 223 days.

(21) Appl. No.: 15/472,512

(22) Filed: Mar. 29, 2017

(65) Prior Publication Data
US 2017/0344356 A1 Nov. 30, 2017

(30) Foreign Application Priority Data
May 30, 2016 (TW) .............................. 105116815 A

(51) Int. Cl.
*G06F 8/65* (2018.01)
*G06F 9/4401* (2018.01)
*G06F 13/42* (2006.01)
*G06F 8/654* (2018.01)

(52) U.S. Cl.
CPC ................ *G06F 8/65* (2013.01); *G06F 8/654* (2018.02); *G06F 9/4411* (2013.01); *G06F 13/4282* (2013.01)

(58) Field of Classification Search
CPC ................................. G06F 8/65; G06F 9/4411
See application file for complete search history.

(56) References Cited

U.S. PATENT DOCUMENTS

2015/0046610 A1* 2/2015 Aster .................... G06F 3/0605
710/74
2017/0139698 A1* 5/2017 Muroyama ............... G06F 8/65

* cited by examiner

*Primary Examiner* — Zachary K Huson
(74) *Attorney, Agent, or Firm* — Brinks Gilson & Lione

(57) ABSTRACT

A method for controlling firmware update of a set of serially coupled expanders is implemented by a host computer. The host computer checks whether or not none of the expanders is in a condition of updating firmware. The host computer permits transmission of the firmware update file to a to-be-updated expander when the determination is affirmative.

7 Claims, 3 Drawing Sheets

CONTROL METHOD OF UPDATING FIRMWARE

CROSS-REFERENCE TO RELATED APPLICATION

This application claims priority of Taiwanese Patent Application No. 105116815, filed on May 30, 2016.

FIELD

The disclosure relates to a control method of updating firmware, and more particularly to a control method for updating firmware of multiple expanders.

BACKGROUND

A conventional daisy-chaining storage system that includes a host computer, and multiple sets of daisy-chaining storage devices coupled to the host computer, where each set of the daisy-chaining storage devices includes a plurality of storage devices serially coupled in a daisy chain. The host computer may include a connection module supporting, for example, serial attached SCSI (SAS) wide port interface. Each storage device may include, for example, a plurality of hard disk drives (HDDs), and two expanders that support the SAS wide port interface, that are coupled to the HDDs, and that are coupled to the expanders of an adjacent storage device, or to the connection module of the host computers using two SAS cables.

However, in a conventional firmware update process for the expanders of the storage devices, since the host computer has no information of connection relationships among multiple connection ports thereof and the expanders, in order to ensure that a firmware update can be completed successfully for each expander, only one of all those expanders that are connected to the same host is permitted to perform the firmware update at one time even if the expanders may be connected to different connection ports, and the firmware update for the next expander is permitted only when the currently performed firmware update is completed. Such a process may require much time for completing the firmware updates on all expanders, resulting in inefficiency, and any abnormality that occurs during an update of any one of the expanders may cause a serious delay in the overall updating process or incompletion of the firmware updates for other expanders.

SUMMARY

Therefore, an object of the disclosure is to provide a method for controlling firmware update. The method can alleviate at least one of the drawbacks of the prior art.

According to the disclosure, the method is implemented by a host computer, and includes steps of: (A) providing a set of expanders that are serially coupled and that include a target expander, and a host computer that includes a connection port coupled to the set of the expanders, and that stores a flag value associated with the set of the expanders, and a start time information; (B) determining, by the host computer, whether or not the flag value is a first predetermined value which indicates that none of the expanders is in a condition of updating firmware; and (C) when the host computer determines in step (B) that the flag value is the first predetermined value, permitting, by the host computer, transmission of a firmware update file to the target expander via at least the connection port, updating, by the host computer, the start time information according to a start time point at which the transmission of the firmware update file via the connection port starts, and setting, by the host computer, the flag value to a second predetermined value which differs from the first predetermined value and which indicates that one of the expanders is in the condition of updating firmware.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
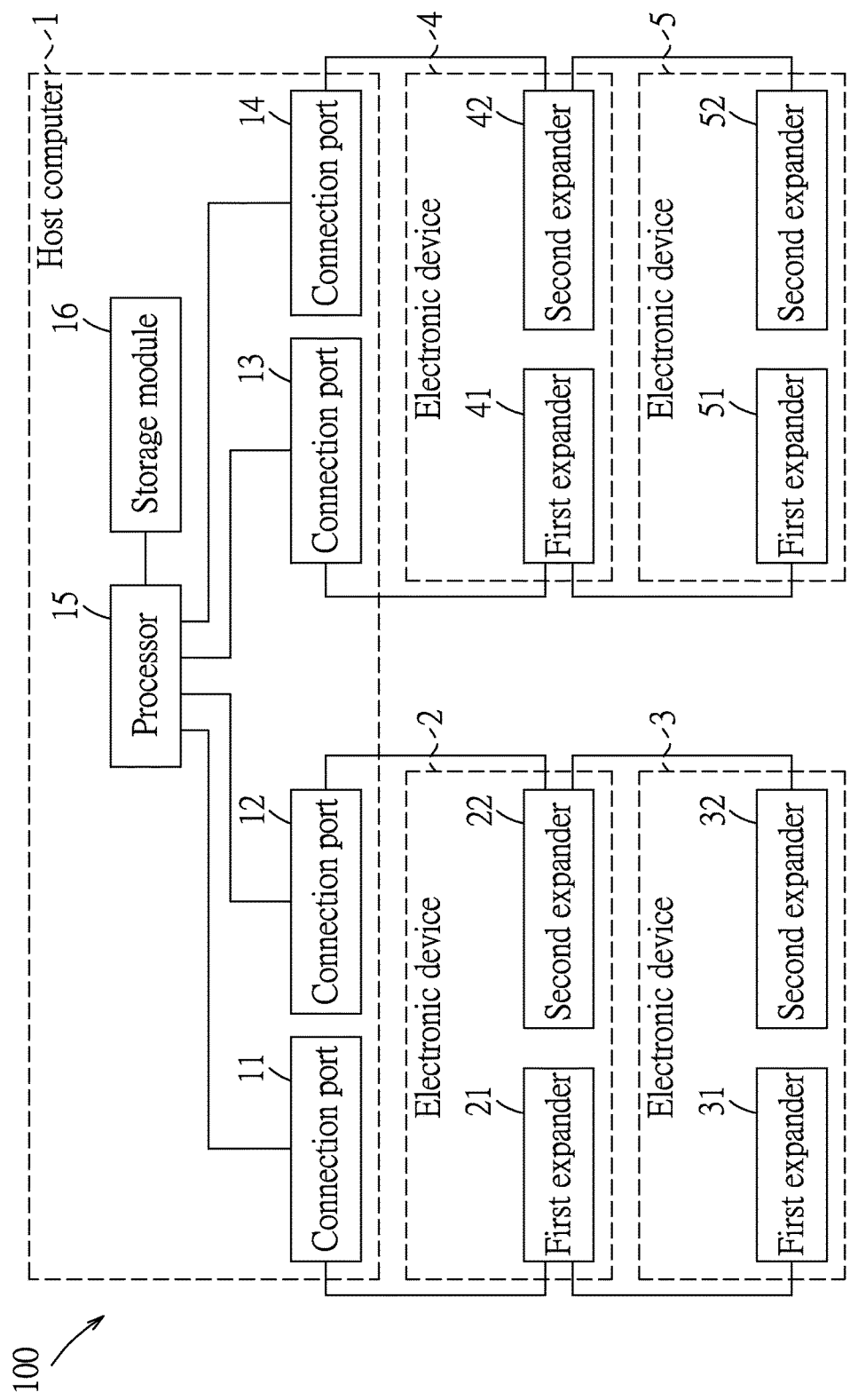
FIG. 1 is a block diagram illustrating a system to implement an embodiment of a control method of updating firmware according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a system 100 is shown to implement an embodiment of a control method of updating firmware according to this disclosure. In this embodiment, the system 100 is, but is not limited to, a storage system that exemplarily includes a host computer 1 and four electronic devices 2-5. It is noted that the number of the electronic devices is not limited to such.

The host computer 1 exemplarily includes four connection ports 11-14, a storage module 16 (e.g., an HDD), and a processor 15 coupled to the connection ports 11-14 and the storage module 16. It is noted that the number of the connection ports is not limited to four. Each of the connection ports 11-14 may be, for example, a wide port of the SAS interface, but the disclosure is not limited thereto. For each of the connection ports 11-14, the storage module 16 stores corresponding state information that includes a flag value indicating a state associated the connection port and/or devices coupled to the connection port, and start time information that indicates a start time point at which transmission of a firmware update file via the connection port starts.

In this embodiment, each of the electronic devices 2-5 is, but is not limited to, a storage device that includes a first expander 21, 31, 41, 51, a second expander 22, 32, 42, 52, and multiple HDDs (not shown) coupled to the first expander 21, 31, 41, 51 and the second expander 22, 32, 42, 52. It is noted that each of the connection ports 11-14, the first expanders 21, 31, 41, 51 and the second expanders 22, 32, 42, 52 is assigned with a unique address. In one example, the unique address of each of the connection ports 11-14 may be written into a code that is executed by the processor 15, and the unique address of each of the expanders may be assigned by pulling an address pin thereof to high or low or leaving the address pin floating. The electronic devices 2, 3 are serially coupled in a daisy chain. In detail, the first expanders 21, 31 of the electronic devices 2, 3 are coupled together using a SAS cable (not shown) (the first expanders 21, 31 forming a set), the second expanders 22, 32 of the electronic devices 2, 3 are coupled together using a SAS cable (not shown) (the second expanders 22, 32 forming a set), and the first and second expanders 21, 22 are respectively coupled to the connection ports 11, 12 using two SAS cables (not shown). The electronic devices 4, 5 are serially coupled in a daisy chain in a similar way. In detail, the first expanders 41, 51 of the electronic devices 4, 5 are coupled together using a SAS cable (not shown) (the first expanders 41, 51 forming a set), the second expanders 42, 52 of the electronic devices 4, 5 are coupled together using a SAS cable (not shown) (the second expanders 42, 52 forming a set), and the first and second expanders 41, 42 are respectively coupled to the connection ports 13, 14 using two SAS cables (not shown).

Figure 2:
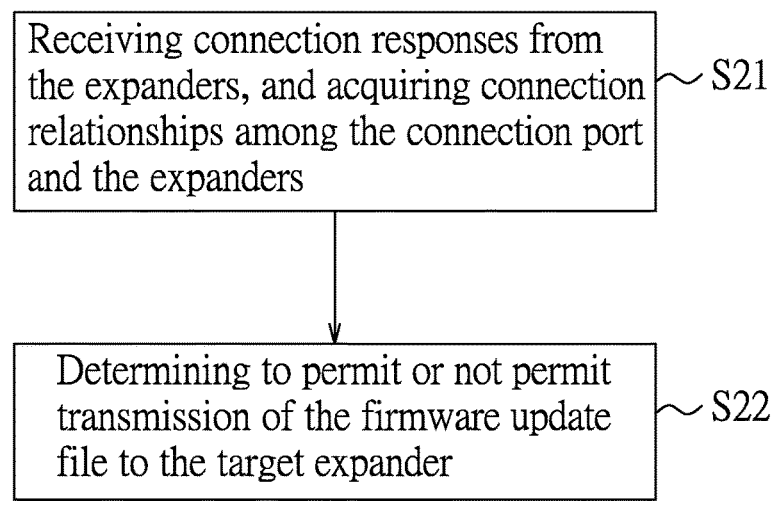
FIG. 2 is a flow chart illustrating steps of the embodiment.

Further referring to FIG. 2, the embodiment of the control method of updating firmware is shown to include steps S21 and S22, which are implemented by the processor 15.

In step S21, the processor 15 receives, from each of the expanders 21, 22, 31, 32, 41, 42, 51, 52, a connection response that contains the unique address of the expander and at least one of the unique address of the corresponding connection port that is directly coupled to the expander or the unique address of another expander that is directly coupled to the expander, and acquires connection relationships among each connection port and the corresponding expanders according to the connection response received from each of the expanders. As an example, for the connection port 11, the processor 15 receives from the expander 21 a connection response that contains the unique address of the expander 21, the unique addresses of the connection port 11 and the expander 31 which are directly coupled to the expander 21, and messages that indicate which address belongs to the expander 21 itself and which addresses belong to the connection port 11 and the expander 31 that are both directly coupled to the expander 21, and receives from the expander 31 a connection response that contains the unique address of the expander 31 and the unique address of the expander 21 which is directly coupled to the expander 31; and the processor 15 thus acquires the connection relationships among the connection port 11 and the corresponding expanders 21, 31 according to the connection response received from each of the expanders 21, 31.

In step S22, upon receipt of a request of updating firmware for a target expander which is one of the first and second expanders 21, 31, 41, 51, 22, 32, 42, 52, the processor 15 temporarily stores the request of updating firmware and a firmware update file into the storage module 16, and determines to permit or not permit transmission of the firmware update file to the target expander via at least the corresponding connection port according to the corresponding state information (e.g., the flag value and/or the start time information) and a predetermined time period (e.g., three minutes, but this disclosure is not limited thereto).

Figure 3:
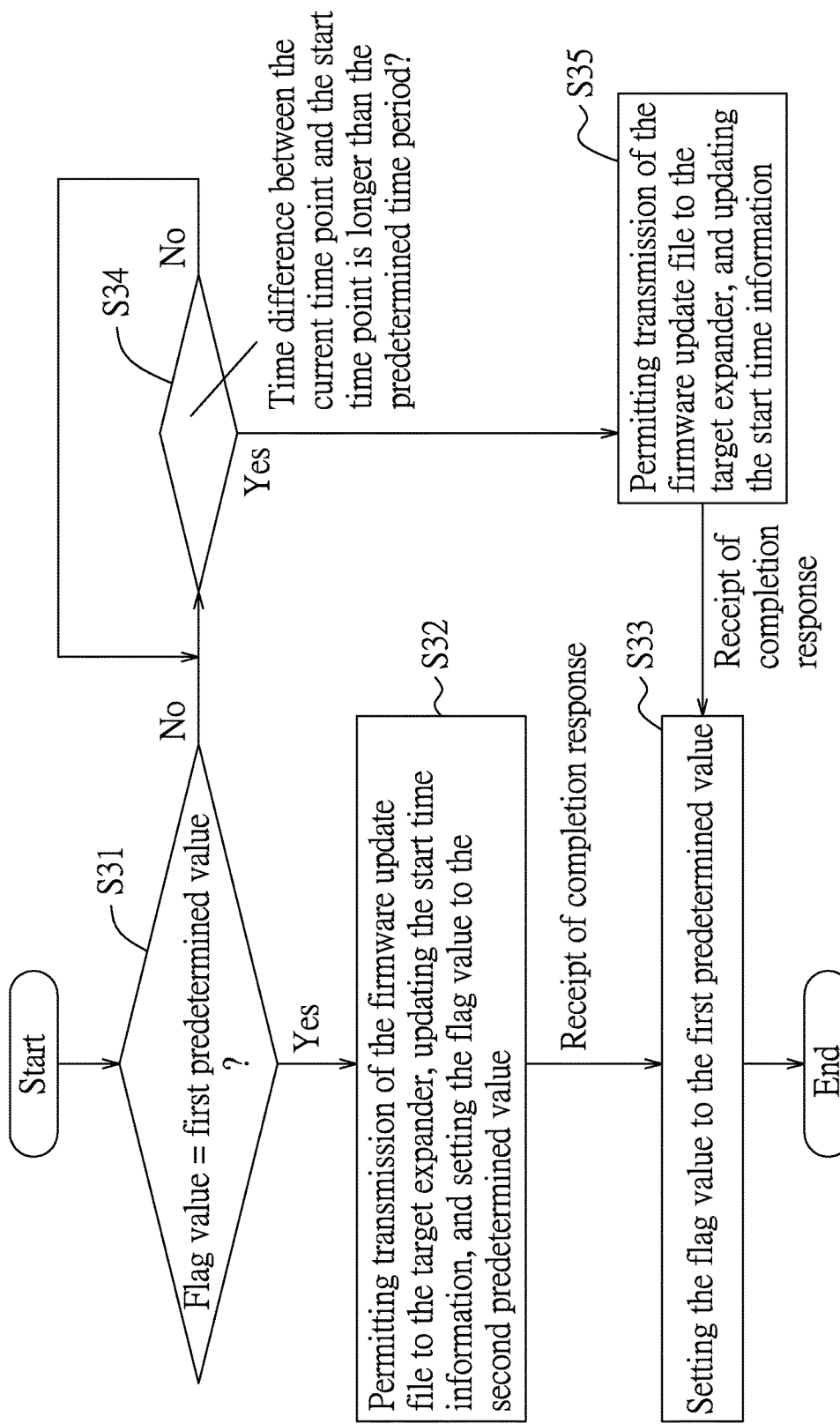
FIG. 3 is a flow chart illustrating detailed steps of the embodiment.

Further referring to FIG. 3, details of step S22 are illustrated to include steps S31-S34, where the target expander is exemplified to correspond to the connection port 11, i.e., the target expander is the first expander 21 or the first expander 31.

In step S31, the processor 15 determines whether or not the flag value corresponding to the connection port 11 is a first predetermined value (e.g., 0) which indicates that none of the corresponding expanders 21, 31 is in a condition of updating firmware. The flow goes to step S32 when affirmative, and goes to step S34 when otherwise.

In step S32, the processor 15 permits transmission of the firmware update file to the target expander via at least the connection port 11, so the target expander may execute the firmware update using the firmware update file received thereby. After completing the firmware update, the target expander may transmit a completion response that indicates completion of the firmware update to the processor 15 via the connection port 11. In this step, the processor 15 further updates the start time information according to the start time point at which the transmission of the firmware update file via the connection port 11 starts, and sets the flag value corresponding to the connection port 11 to a second predetermined value (e.g., 1) which differs from the first predetermined value and which indicates that one of the expanders 21, 31 that corresponds to the connection port 11 is in the condition of updating firmware. It is noted that the transmission of the firmware update file to the target expander is performed according to the connection relationships acquired in step S21. For example, when the target expander is the first expander 31, the processor 15 transmits the firmware update file to the first expander 31 via both of the connection port 11 and the first expander 21 according to the connection relationships thereamong. Then, upon the processor 15 receiving from the target expander the completion response, the flow goes to step S33.

In step S33, the processor 15 sets the flag value corresponding to the connection port 11 to the first predetermined value.

In step S34, the processor 15 determines whether or not a time difference between a current time point and the start time point indicated by the start time information corresponding to the connection port 11 is longer than the predetermined time period. The flow goes to step S32 when affirmative, and goes to step S34 again when otherwise. In other words, when the determination in step S34 is negative, the processor 15 waits until the time difference is longer than the predetermined time period.

In step S35, the processor 15 permits transmission of the firmware update file to the target expander via at least the connection port 11, and updates the start time information according to the start time point at which the transmission of the firmware update file via the connection port 11 starts. Then, upon the processor 15 receiving from the target expander the completion response, the flow goes to step S33.

It is noted that the predetermined time period is set to be longer than a time period required for any one of the expanders to complete the firmware update. In other words, the firmware update for each expander should ideally be finished within the predetermined time period. Accordingly, by virtue of step S34, when the firmware update of a former target expander fails to be normally completed within the predetermined time period so that the flag value cannot be set back to the first predetermined value, the firmware update of the current target expander may still be executable by the processor 15 permitting the transmission of the firmware update file when the time difference between the current time point and the start time point (i.e., time cost in the firmware update of the former expander) is longer than the predetermined time period, thereby preventing delay or incompletion of the firmware update for expander(s) following the abnormal firmware update for the former expander.

In the conventional process, since the host computer is not aware of connection relationships among the ports and the expanders, only one expander among all the expanders that are connected to the host computer through the ports is permitted to perform the firmware update at one time for the host computer. In this embodiment, the processor 15 may acquire the connection relationships among each connection port 11-14 and the corresponding expanders 21, 31, 22, 32, 41, 51, 42, 52 according to the connection responses. Upon receipt of the request of updating firmware for a designated expander, the host computer 1 may check the flag value to confirm whether or not firmware update of another expander corresponding to the same connection port is in progress, thereby determining to allow or not allow the request of updating firmware. As a result, in this embodiment, one expander is permitted to perform the firmware update at one time for each connection port 11-14 of the host computer 1, in other words, two or more expanders are permitted to perform firmware update at the same time, as long as the expanders correspond to different connection ports, thereby simultaneously executing step S22 (i.e., steps S31-S34) for the connection ports 11-14 by multitasking. In comparison to the conventional process, the embodiment significantly reduces time required for completing firmware updates for all of the expanders in multiple daisy chains.

In summary, the control method of updating firmware according to this disclosure may complete firmware updates for all of the expanders (i.e., the first expanders 21, 31, 41, 51 and the second expanders 22, 32, 42, 52 in the embodiment) in a relatively shorter time period by multitasking, and prevent delay or incompletion of the entire firmware update process for all of the expanders due to occurrence of an abnormal firmware update, resulting in higher efficiency.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A control method for updating firmware, comprising steps of:
   (A) providing a set of expanders that are serially coupled and that include a target expander, and a host computer that includes a connection port coupled to the set of the expanders, and that stores a flag value associated with the set of the expanders, and a start time information associated with the connection port;
   (B) determining, by the host computer, whether or not the flag value is a first predetermined value which indicates that none of the expanders coupled to the connection port is in a condition of updating firmware; and
   (C) when the host computer determines in step (B) that the flag value is the first predetermined value, permitting, by the host computer, transmission of a firmware update file to the target expander via at least the connection port, updating, by the host computer, the start time information according to a start time point at which the transmission of the firmware update file via the connection port starts, and setting, by the host computer, the flag value to a second predetermined value which differs from the first predetermined value and which indicates that one of the expanders is in the condition of updating firmware.

2. A control method for updating firmware, comprising steps of:
   (A) providing a set of expanders that are serially coupled and that include a target expander, and a host computer that includes a connection port coupled to the set of the expanders, and that stores a flag value associated with the set of the expanders, and a start time information associated with the connection port;
   (B) determining, by the host computer, whether or not the flag value is a first predetermined value which indicates that none of the expanders coupled to the connection port is in a condition of updating firmware;
   (C) when the host computer determines in step (B) that the flag value is the first predetermined value, permitting, by the host computer, transmission of a firmware update file to the target expander via at least the connection port, updating, by the host computer, the start time information according to a start time point at which the transmission of the firmware update file via the connection port starts, and setting, by the host computer, the flag value to a second predetermined value which differs from the first predetermined value and which indicates that one of the expanders is in the condition of updating firmware;
   (D) when the host computer determines in step (B) that the flag value is not the first predetermined value, determining, by the host computer, whether or not a time difference between a current time point and the start time point indicated by the start time information is longer than a predetermined time period; and
   (E) when the host computer determines in step (D) that the time difference is longer than the predetermined time period, permitting, by the host computer, the transmission of the firmware update file to the target expander via at least the connection port, and updating, by the host computer, the start time information according to the start time point at which the transmission of the firmware update file via the connection port starts.

3. The control method of claim 2, further comprising a step of: (F) when the host computer determines in step (D) that the time difference is not longer than the predetermined time period, repeating step (D) by the host computer.

4. The control method of claim 2, further comprising a step of: (F) upon receipt from the target expander of a completion response that indicates completion of updating firmware, setting the flag value to the first predetermined value by the host computer.

5. A control method for updating firmware of claim 1, comprising steps of:
   (A) providing a set of expanders that are serially coupled and that include a target expander, and a host computer that includes a connection port coupled to the set of the expanders, and that stores a flag value associated with the set of the expanders, and a start time information associated with the connection port;
   (B) determining, by the host computer, whether or not the flag value is a first predetermined value which indicates that none of the expanders coupled to the connection port is in a condition of updating firmware;
   (C) when the host computer determines in step (B) that the flag value is the first predetermined value, permitting, by the host computer, transmission of a firmware update file to the target expander via at least the connection port, updating, by the host computer, the start time information according to a start time point at which the transmission of the firmware update file via the connection port starts, and setting, by the host computer, the flag value to a second predetermined value which differs from the first predetermined value and which indicates that one of the expanders is in the condition of updating firmware; and each of the expanders and the connection port being assigned with a unique address, before step (B), steps of:

(F) receiving from each of the expanders by the host computer, a connection response that contains the unique address of the expander and at least one of the unique address of the connection port that is directly coupled to the expander or the unique address of another one of the expanders that is directly coupled to the expander, and;

(G) acquiring, by the host computer, connection relationships among the connection port and the expanders according to the connection response received from each of the expanders in step (F), wherein the transmission of the firmware update file to the target expander is performed according to the connection relationships acquired in step (G).

6. The control method of claim 1, further comprising a step of: after the host computer receiving a request of updating firmware for the target expander, storing, by the host computer, the request of updating firmware and the firmware update file into a storage module of the host computer.

7. The control method of claim 1, wherein step (A) includes providing a plurality of sets of expanders, and the host computer that includes a plurality of the connection ports respectively coupled to the sets of the expanders, and that includes a storage module storing, for each of the connection ports, the flag value associated with one of the sets of the expanders that is coupled to the connection port, and the start time information associated with the connection ports;

wherein, for each of the sets of expanders, the expanders are serially coupled; and wherein, for at least one of the sets of expanders, the expanders include the target expander.

* * * * *

UNITED STATES PATENT AND TRADEMARK OFFICE
CERTIFICATE OF CORRECTION

PATENT NO. : 10,394,545 B2
APPLICATION NO. : 15/472512
DATED : August 27, 2019
INVENTOR(S) : Chi-Yuan Yen Page 1 of 1

It is certified that error appears in the above-identified patent and that said Letters Patent is hereby corrected as shown below:

In the Claims

In Claim 5 (Column 6), Line 54, "of claim 1" should be deleted.

Signed and Sealed this
Tenth Day of December, 2019

Andrei Iancu
*Director of the United States Patent and Trademark Office*